United States Patent
Nakamoto et al.

(10) Patent No.: US 7,720,394 B2
(45) Date of Patent: May 18, 2010

(54) OPTICAL RECEPTION CIRCUIT AND IDENTIFICATION LEVEL CONTROLLING METHOD FOR THE SAME

(75) Inventors: Ken-ichi Nakamoto, Kawasaki (JP); Satoshi Ide, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 621 days.

(21) Appl. No.: 11/607,846

(22) Filed: Dec. 4, 2006

(65) Prior Publication Data
US 2008/0031638 A1 Feb. 7, 2008

(30) Foreign Application Priority Data
Aug. 4, 2006 (JP) ............... 2006-213649

(51) Int. Cl.
*H04B 10/06* (2006.01)
(52) U.S. Cl. .................. 398/208; 398/209; 398/202
(58) Field of Classification Search ......... 398/202–214; 330/59; 250/214 A, 338.1
See application file for complete search history.

(56) References Cited

U.S. PATENT DOCUMENTS 6,038,049 A * 3/2000 Shimizu et al. ............. 398/210
6,822,214 B2 * 11/2004 Han et al. ................ 250/214 R
7,557,333 B2 * 7/2009 Takahashi et al. ........ 250/214 R

FOREIGN PATENT DOCUMENTS

| JP | 6-310967 | 11/1994 |
| JP | 9-270755 | 10/1997 |

\* cited by examiner

*Primary Examiner*—Quan-Zhen Wang
(74) *Attorney, Agent, or Firm*—Fujitsu Patent Center

(57) ABSTRACT

An optical reception circuit and an identification level controlling method for an optical reception circuit are disclosed wherein reception sensitivity degradation arising from transmission waveform degradation by chromatic dispersion can be suppressed. The optical reception circuit includes a photoelectric converter for converting reception light into an electric signal, a pre-amplifying unit for amplifying the electric signal, a main amplifier for amplifying an output of the pre-amplifying unit, a monitor for monitoring the output of the pre-amplifying unit, and a controller for controlling an identification level in the main amplifier based on an output of the monitor. The monitor includes a limiter amplifier for amplifying the output of the pre-amplifying unit, and an average value detector for detecting a time average value of an output amplitude of the limiter amplifier.

7 Claims, 12 Drawing Sheets

OPTICAL RECEPTION CIRCUIT AND IDENTIFICATION LEVEL CONTROLLING METHOD FOR THE SAME

CROSS REFERENCE TO RELATED APPLICATIONS(S)

This application is based on and hereby claims priority to Japanese Application No. 2006-213649 filed on Aug. 4, 2006 in Japan, the contents of which are hereby incorporated by reference.

BACKGROUND OF THE INVENTION

1) Field of the Invention

The present invention relates to an optical reception circuit and a controlling method for the same, and particularly to a technique suitable for the improvement, for example, in the reception sensitivity characteristic of an optical receiver used for optical communication.

2) Description of the Related Art

FIG. 11 is a block diagram showing a configuration of essential part (main signal unit) of an optical receiver. The optical receiver (main signal unit 100) shown in FIG. 11 includes a photoelectric converter 110 having a light reception device 111 such as an avalanche photodiode (APD), a pre-amplifying unit 120 having a preamplifier (output differential amplifier) 121, and a main amplifier 130 having a limiter amplifier (differential amplifier) 131. In the optical receiver (main signal unit 100), light received by the light reception device 111 is converted into a current signal corresponding to a light amount (light intensity) of the received light. Then, the current signal is converted into a voltage signal of a value corresponding to that of the current signal and amplified to a required voltage level by the preamplifier 121. The amplified voltage signal is outputted as a differential voltage signal from a non-negated (positive phase) output terminal and a negated (negative phase) output terminal of the preamplifier 121 to the limiter amplifier 131.

In the limiter amplifier 131, the reference voltage (identification voltage) is adjusted (fixed) to a time average value (that is, identification level=50%) of the amplitude of the differential voltage signal (bipolar sign) so that the limiter amplifier 131 identifies and regenerates the data. In other words, a magnitude comparison result between the reference voltage and an input voltage signal is outputted as a data identification result.

Incidentally, the amplitude of the output voltage of the amplifiers 121 and 131 in the optical receiver is likely to be varied by dispersion in fabrication or an operation condition (temperature variation and so forth) of them. Therefore, it is preferable to automatically control the identification level to the time average value of the amplitude of the differential voltage signal. Therefore, also a technique is known wherein, for example, as shown in FIG. 12, an identification level controller 140 is provided so that the reference voltage for the limiter amplifier 131 is automatically adjusted (controlled) to the time average value of the amplitude. The automatic adjustment is implemented, for example, by monitoring the output voltage of the limiter amplifier 131.

It is to be noted that, as another known technique, a technique proposed in Japanese Patent Laid-Open No. HEI 9-270755 (hereinafter referred to as Patent Document 1) is available. The technique relates to an automatic threshold value controlling circuit used in an optical reception apparatus, and it is an object of the technique that, even if an offset voltage for malfunction prevention is applied, a threshold value voltage (which corresponds to the reference voltage mentioned hereinabove) is controlled to a time average value of the amplitude of reception data so that, even if the duty ratio of the reception data is degraded by a non-linear characteristic of a preamplifier, the degraded duty ratio can be corrected.

To this end, in the technique disclosed in Patent Document 1, where the amplitude of the reception data is in a linear region of the preamplifier, the identification voltage is controlled to the time average value of the amplitude of the reception data. However, where the amplitude of the reception data is in a non-linear region of the preamplifier, the identification voltage is controlled so as to be higher than the time average value of the amplitude of the reception data.

Also a technique proposed in Japanese Patent Laid-Open No. HEI 6-310967 (hereinafter referred to as Patent Document 2) is available as a further known technique.

This technique relates to an identification level controlling method for a system wherein the reception signal level in burst reception or the like varies by a great amount in time. In such a system as just described, it is necessary to control the identification level dynamically depending upon the reception signal level. Therefore, the system includes a peak detection circuit for detecting a peak level of a reception signal and a bottom detection circuit for detecting a bottom level of the reception signal, and outputs a substantially middle value between a peak value and a bottom value as a threshold value.

As a result of increase of data traffic in recent years, high-speed and great capacity communication is essentially required. Construction of a great capacity photonic network using high density wavelength division multiplexing (Dense Wavelength Division Multiplexing) is proceeding. The form of a network varies from a point-to-point type to a ring or mesh type, and a complicated configuration is applied wherein the path and the transmission distance differ depending upon the wavelength. If the transmission distance differs, then also the influence of chromatic dispersion on the transmission light differs.

For example, the optimum identification level differs in response to the chromatic dispersion amount as seen in FIG. 5. It can be recognized that, where the identification level is fixed to 50%, the BER degrades significantly from 1E-12 to 1E-6 at a positive dispersion of 1,600 ps/nm. Therefore, in an optical receiver, it is necessary to absorb the influence of the chromatic dispersion so as to satisfy a desired reception sensitivity characteristic. However, while various controlling methods of an identification level including the techniques disclosed in Patent Documents 1 and 2 have been proposed as a countermeasure for improving the reception sensitivity characteristic of an optical receiver, a method for suppressing degradation of the reception sensitivity caused by an influence of chromatic dispersion has not been proposed as yet.

SUMMARY OF THE INVENTION

It is an object of the present invention to provide an optical reception circuit and an identification level controlling method for an optical reception circuit wherein reception sensitivity degradation arising from transmission waveform degradation by chromatic dispersion can be suppressed.

In order to attain the object described above, according to an aspect of the present invention, there is provided:

(1) an optical reception circuit, comprising a photoelectric converter for converting reception light into an electric signal, a pre-amplifying unit for amplifying the electric signal, a main amplifier for amplifying an output of the pre-amplifying unit, a monitor for monitoring the output of the pre-amplifying unit, and a controller for controlling an identification level in the main amplifier based on an output of the monitor, the monitor including a limiter amplifier for amplifying the output of the pre-amplifying unit, and an average value detector for detecting a time average value of an output amplitude of the limiter amplifier.

(2) The main amplifier may be formed from a limiter amplifier for amplifying output of the pre-amplifying unit, and the monitor may include an average value detection circuit for detecting a time average value of an output amplitude of the limiter amplifier.

(3) The controller may calculate a relationship of the identification level to the time average value of the output amplitude of the limiter amplifier, based on a relationship of a duty of an output waveform of the pre-amplifying unit to the time average value of the output amplitude of the limiter amplifier and a relationship of a chromatic Dispersion amount of the reception light to the duty and a relationship of the identification level to the chromatic dispersion amount, and control the identification level in the main amplifier based on the result of the calculation.

(4) Further, the controller may include a memory storing at least the relationship of the identification level to the time average value of the output amplitude of the limiter amplifier in advance.

(5) Further, the controller may be formed from a micro processing unit (MPU).

(6) Further, the controller may include an analog arithmetic operator for controlling the identification level based on an analog arithmetic operation expression which represents the relationship of the identification level to the time average value of the output amplitude of the limiter amplifier.

(7) Further, the photoelectric converter and the pre-amplifying unit may be formed from an integrated optical device.

(8) Further, according to another aspect of the invention, there is provided an identification level controlling method for an optical reception circuit which includes a photoelectric converter for converting reception light into an electric signal, a pre-amplifying unit for amplifying the electric signal, a main amplifier for amplifying an output of the pre-amplifying unit, and a controller for controlling an identification level of the main amplifier, comprising the steps of monitoring the output of the pre-amplifying unit, and controlling the identification level in the main amplifier based on a time average value of the output amplitude detected at the monitoring step.

(9) Here, at the monitoring step, the output of the pre-amplifying unit may be amplified by a limiter amplifier, and a time average value of the output amplitude of the limiter amplifier may be detected.

(10) Further, according to a further aspect of the invention, there is provided an identification level controlling method for an optical reception circuit which includes a photoelectric converter for converting reception light into an electric signal, a pre-amplifying unit for amplifying the electric signal, a main amplifier for amplifying an output of the pre-amplifying unit, and a controller for controlling an identification level of the main amplifier, comprising the steps of monitoring an output of the main amplifier, and controlling the identification level in the main amplifier based on a time average value of the output amplitude detected at the monitoring step.

With the optical reception circuit and the identification level controlling methods of the present invention, since an output of the limiter amplifier for amplifying an output of the pre-amplifying unit or an output of the main amplifier is monitored to detect a time average value of an amplitude so that an amount of chromatic dispersion applied to reception light is detected (predicted) and an identification level in the main amplifier is dynamically controlled in response to a result of the detection, at least reception sensitivity degradation by chromatic dispersion of an optical reception circuit can be suppressed and a significant improvement effect of the reception sensitivity characteristic can be expected.

The above and other objects and features of the present invention will be understood by reading carefully the following description with accompanying drawings. Preferred embodiments of the present invention will be described in more detail referring to the accompanying drawings. The drawings are illustrative and are not to be limitative of the scope of the present invention.

DESCRIPTION OF THE PREFERRED EMBODIMENTS

In the following, embodiments of the present invention are described in detail with reference to the drawings. It is to be noted that the present invention is not limited to the embodiments described below but can naturally be carried out in various modified forms without departing from the scope of the present invention.

[A] Description of an Embodiment

Figure 1:
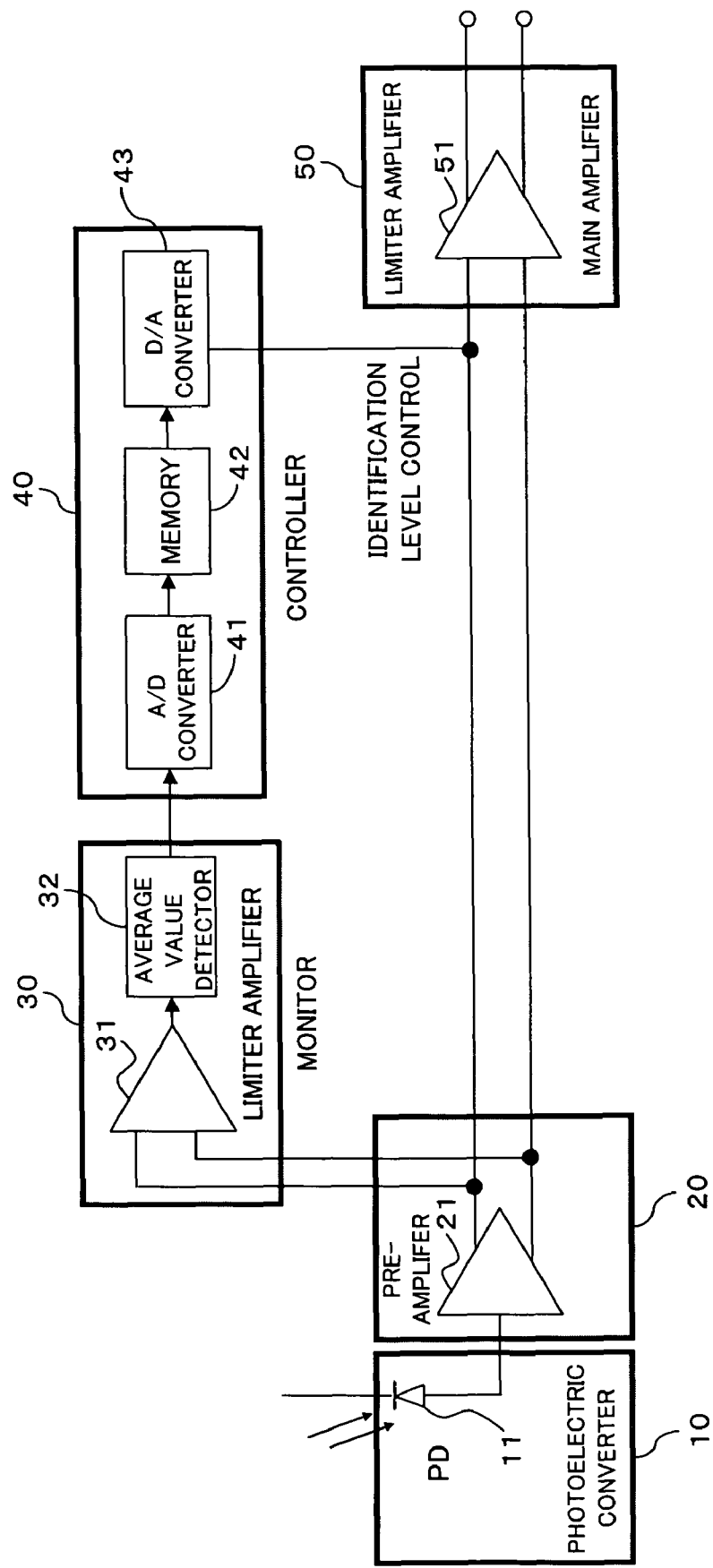
FIG. 1 is a block diagram showing a configuration of essential part of an optical reception circuit according to an embodiment of the present invention.

FIG. 1 is a block diagram showing a configuration of essential part of an optical reception circuit according to an embodiment of the present invention. The optical reception circuit shown in FIG. 1 includes a photoelectric converter 10 having a light reception device 11 such as a photodiode (PD), a pre-amplifying unit 20 having a preamplifier 21, a monitor 30 having a limiter amplifier 31 and an average value detector 32, a controller 40 having an A/D converter 41, a memory 42 and a D/A converter 43, and a main amplifier 50 having a limiter amplifier 51.

Here, the light reception device 11 of the photoelectric converter 10 converts received light into a current signal corresponding to the intensity of the received light, and the preamplifier 21 of the pre-amplifying unit 20 converts the current signal inputted from the light reception device 11 into a voltage signal and amplifies the voltage signal to a required voltage level. The amplified voltage signal is inputted as a differential voltage signal from a non-negated (positive phase) output terminal and a negated (negative phase) output terminal of the preamplifier 21 to the limiter amplifier 31 of the monitor 30 and the limiter amplifier 51 of the main amplifier 50.

The monitor 30 amplifies the output voltage of the preamplifier 21 by means of the limiter amplifier 31 and monitors the output of the preamplifier 21 to supervise (detect) the average value (time average value of the amplitude) of the output so that it can predict the duty (Duty) of the output voltage waveform of the preamplifier 21. The monitor 30 detects the average value of the output of the limiter amplifier 31 by means of the average value detector 32.

Figure 2:
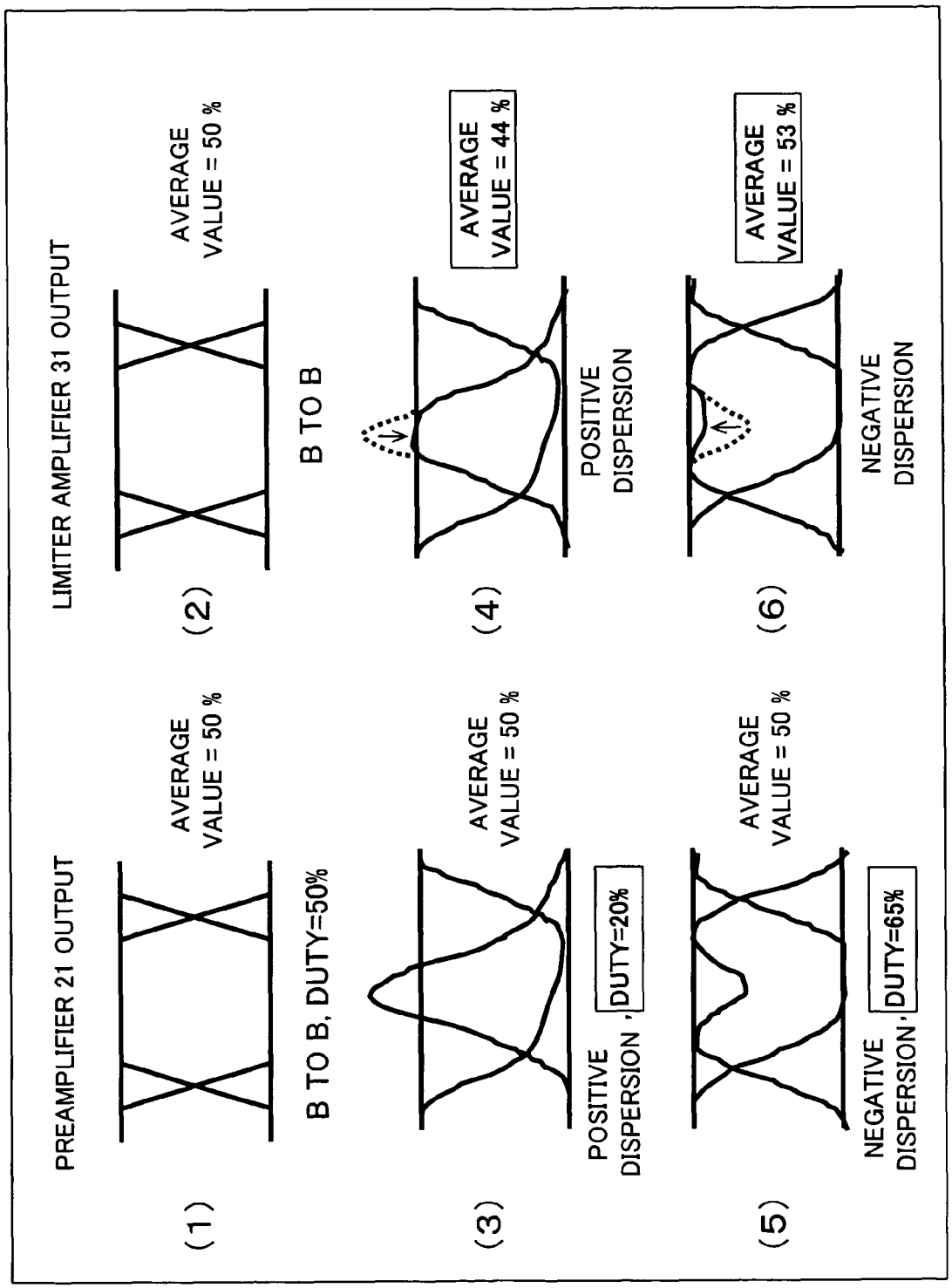
FIG. 2 is a view illustrating a relationship between the duty (Duty) of an output waveform of a preamplifier shown in FIG. 1 and the output average value of a limiter amplifier of a monitor.

The principle of the process in the monitor 30 is described below with reference to FIG. 2. It is to be noted that, in FIG. 2, (1) and (2) indicate an example of an output waveform of the preamplifier 21 and the limiter amplifier 31 where the waveform of the reception light is not degraded by [B to B] (hereinafter described), respectively. Further, (3) and (4) indicate an example of an output waveform of the preamplifier 21 and the limiter amplifier 31 where the waveform of the received signal light is degraded by positive chromatic dispersion (positive dispersion), respectively. Furthermore, (5) and (6) indicate an example of an output waveform of the preamplifier 21 and the limiter amplifier 31 where the waveform of the received signal light is degraded by negative chromatic dispersion (negative dispersion), respectively. It is to be noted that [B to B] is an abbreviation of [Back to Back] and signifies that the transmission distance of transmission light is zero (in other words, that the transmission light is received directly by the light reception device 11 experimentally without the intervention of an optical transmission path).

In particular, where the output of the preamplifier 21 is examined, in the case of the [B to B] of (1), the waveform indicates a duty (Duty)=50%; in the case of the positive dispersion of (3), the waveform indicates a Duty=20% and exhibits an overshoot on the mark side; and in the case of the negative dispersion of (5), the waveform indicates a Duty=65% and exhibits a split between a rise and a fall on the mark side. For example, if the mark ratio is set to ½ and the average value of the amplitude of the waveform in the case of the [B to B] is set to 50%, then since no limiter is applied, also the average value of the waveforms of in the cases of the positive dispersion and the negative dispersion becomes 50%.

On the other hand, where the output of the limiter amplifier 31 is examined, the Duty of the waveforms is substantially same as that of the output of the preamplifier 21. However, the average value in the case of the [B to B] of (2) is 50% similarly. However, the average value in the case of the positive dispersion (approximately +1,600 ps/ns) of (4) is 44% because the overshoot on the mark side is limited by the limiter amplifier 31. Further, the average value in the case of the negative dispersion (approximately −500 ps/ns) of (6) is 53% because the depression on the mark side is raised by the limiter amplifier 31.

In particular, it can be detected that the average value of the waveform of the Duty=20% in the case of the positive dispersion is 44% and the average value of the waveform of the Duty=65% in the case of the negative dispersion is 53%. Accordingly, the Duty of the waveform can be predicted by providing the average value detector 32 at the following stage of the limiter amplifier 31.

The controller 40 controls (produces a controlling signal for) the identification level (identification voltage) of the main amplifier 50 (limiter amplifier 51) based on the average value detected by the average value detector 32 of the monitor 30. The A/D converter 41 converts the average value detected by the average value detector 32 into a digital value. The memory 42 stores information (controlling information) of the identification level for the digital value (average value).

Figure 3:
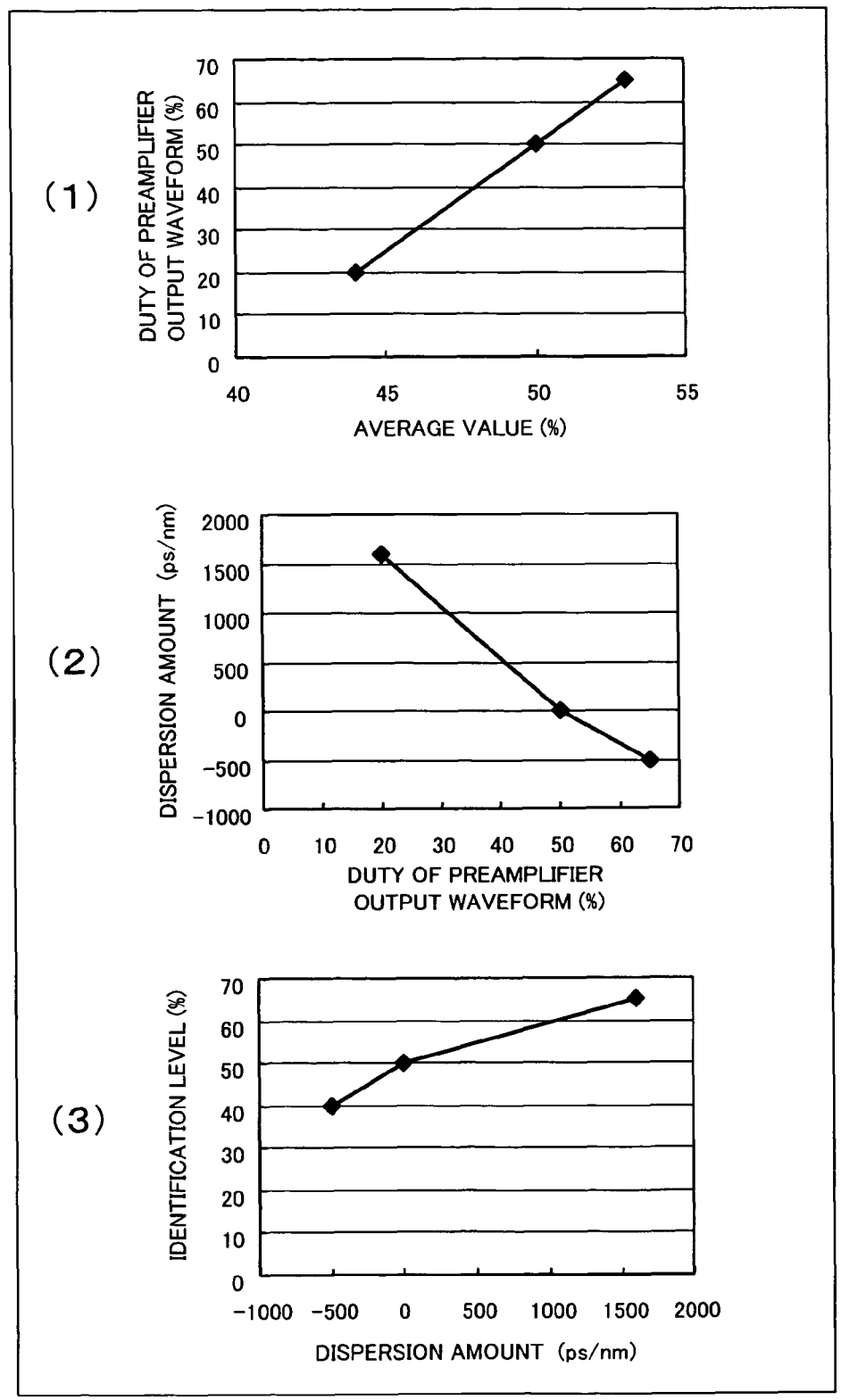
FIG. 3 is a view illustrating a relationship between the average value and the Duty of the output waveform of the preamplifier, a relationship between the Duty of the output waveform of the preamplifier and the chromatic dispersion amount, and a relationship between the chromatic dispersion amount and the identification level in the present embodiment.

It is to be noted that the information of the average value to identification level can be determined based on, for example, a relationship between the average value and the Duty of the output waveform of the preamplifier 21 based on actual measurement illustrated in (1) of FIG. 3, a relationship between the Duty of the output waveform of the preamplifier 21 and the chromatic dispersion amount based on actual measurement illustrated in (2) of FIG. 3, and a relationship between the chromatic dispersion amount and the identification level based on actual measurement illustrated in (3) of FIG. 3. Accordingly, if the relationships are stored as conversion tables or the like into the memory 42, then the controller 40 can calculate the Duty and the chromatic dispersion amount of the output waveform of the preamplifier 21 and the identification level of the limiter amplifier 51 from the average value monitored by the monitor 30. It is to be noted that, only if at least the identification level for the average value can be determined, all of the three relationships need not necessarily be stored in the memory 42.

In particular, the monitor 30 in the present embodiment monitors the Duty of the waveform which varies in response to the amount of the chromatic dispersion applied to the reception light so that the amount of the chromatic dispersion applied to the reception light is detected indirectly.

The D/A converter 43 D/A converts the identification level (digital value) outputted from the memory 42 into an analog value. The analog value obtained by the process just described is supplied as an identification level controlling signal for the main amplifier 50 (limiter amplifier 51) so that the identification level is controlled.

Then, the limiter amplifier 51 of the main amplifier 50 outputs a magnitude comparison result between the identification voltage controlled (set) by the controller 40 and the input voltage signal as a data identification result to reproduce the data.

Operation of the optical reception circuit configured in such a manner as described above is described below. First, received light is received and converted into current corresponding to the received light amount (intensity) by the light reception device 11 of the photoelectric converter 10, and the resulting current is converted into a voltage signal and amplified to a required voltage level by the preamplifier 21. The amplified voltage signal is inputted as a differential voltage signal from the non-negated output terminal and the negated output terminal of the preamplifier 21 to the monitor 30 (limiter amplifier 31) and the main amplifier 50 (limiter amplifier 51).

In the monitor 30, the output signal (differential voltage signal) of the preamplifier 21 is amplified by the limiter amplifier 31, and an average value of the output of the limiter amplifier 31 is detected by the average value detector 32. The detected average value is inputted to the controller 40 and is converted into a digital value by the A/D converter 41, and the resulting digital value is inputted as an index address to the memory 42.

The memory 42 outputs the information (control information) of the identification level stored in advance therein as described hereinabove with reference to FIGS. 2 and 3 in an address region designated by the index address, and the information of the identification level is converted into an analog signal by the D/A converter 43 and supplied as a controlling signal for the identification level of the limiter amplifier 50.

Figure 4:
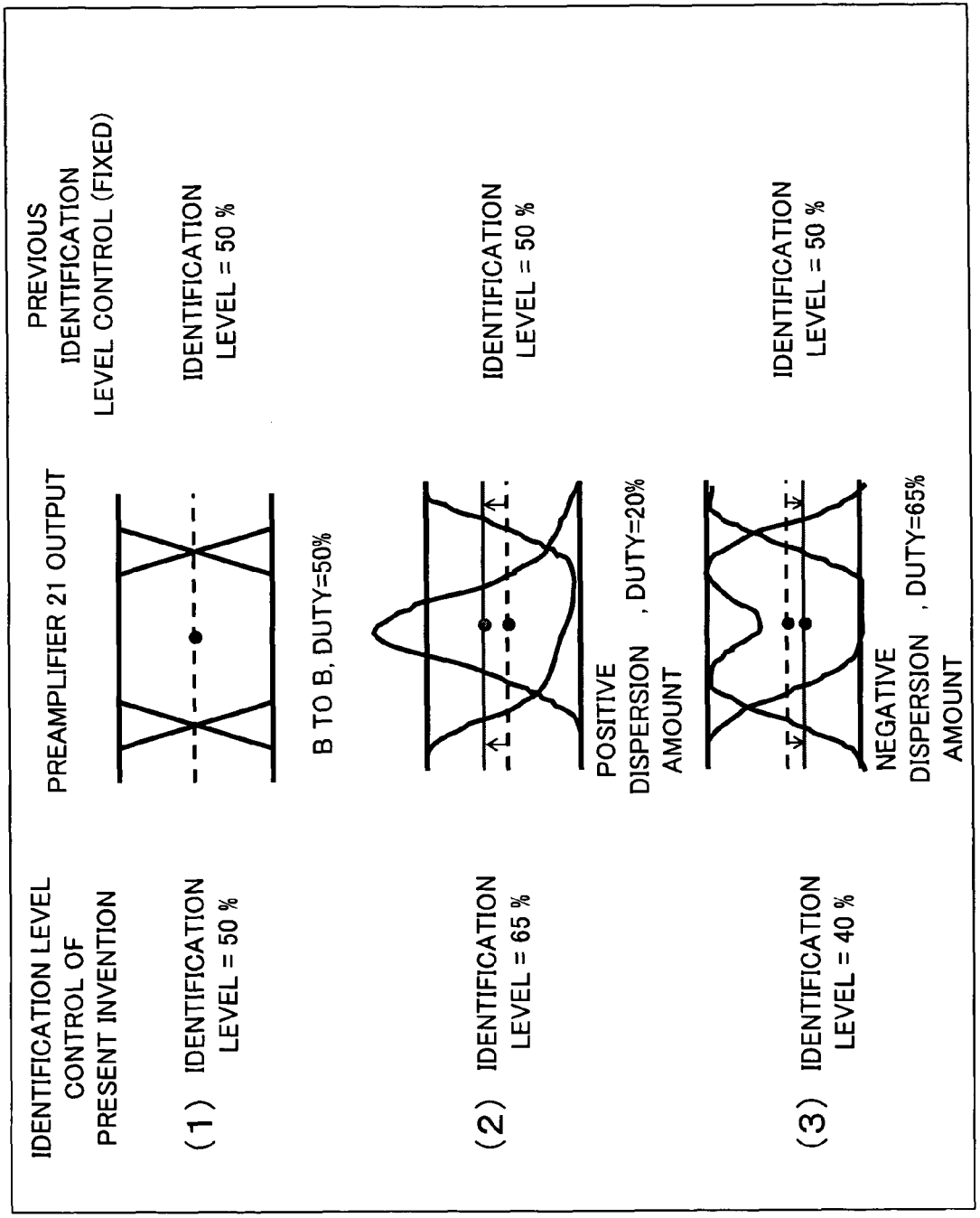
FIG. 4 is a view illustrating identification level control of the optical reception circuit shown in FIG. 1 in comparison with that of a conventional technique.

While the identification level in the limiter amplifier 51 in the [B to B] state is controlled to 50% similarly as in the conventional technique, for example, as seen in (1) of FIG. 4, where a positive dispersion (for example, approximately +1,600 ps/ns) is applied to the reception light as seen in (2) of FIG. 4, the identification level of the limiter amplifier 51 is controlled to 65% from the average value detected by the average value detector 32 and the relationships illustrated in (1) to (3) of FIG. 3. On the contrary, where a negative dispersion (for example, −500 ps/ns) is applied to the reception light as seen in (3) of FIG. 4, the identification level of the limiter amplifier 51 is controlled to 40% from the average value detected by the average value detector 32 and the relationships illustrated in (1) to (3) of FIG. 3. It is to be noted that, in the conventional technique, the identification level is fixed to 50% irrespective of the chromatic dispersion amount.

In this manner, where the identification level in the limiter amplifier 51 is dynamically controlled in response to the chromatic dispersion applied to the reception light, reception sensitivity degradation by the chromatic dispersion in the optical reception circuit can be suppressed, and as a result, an effect of significant improvement in the reception sensitivity characteristic can be anticipated.

Figure 5:
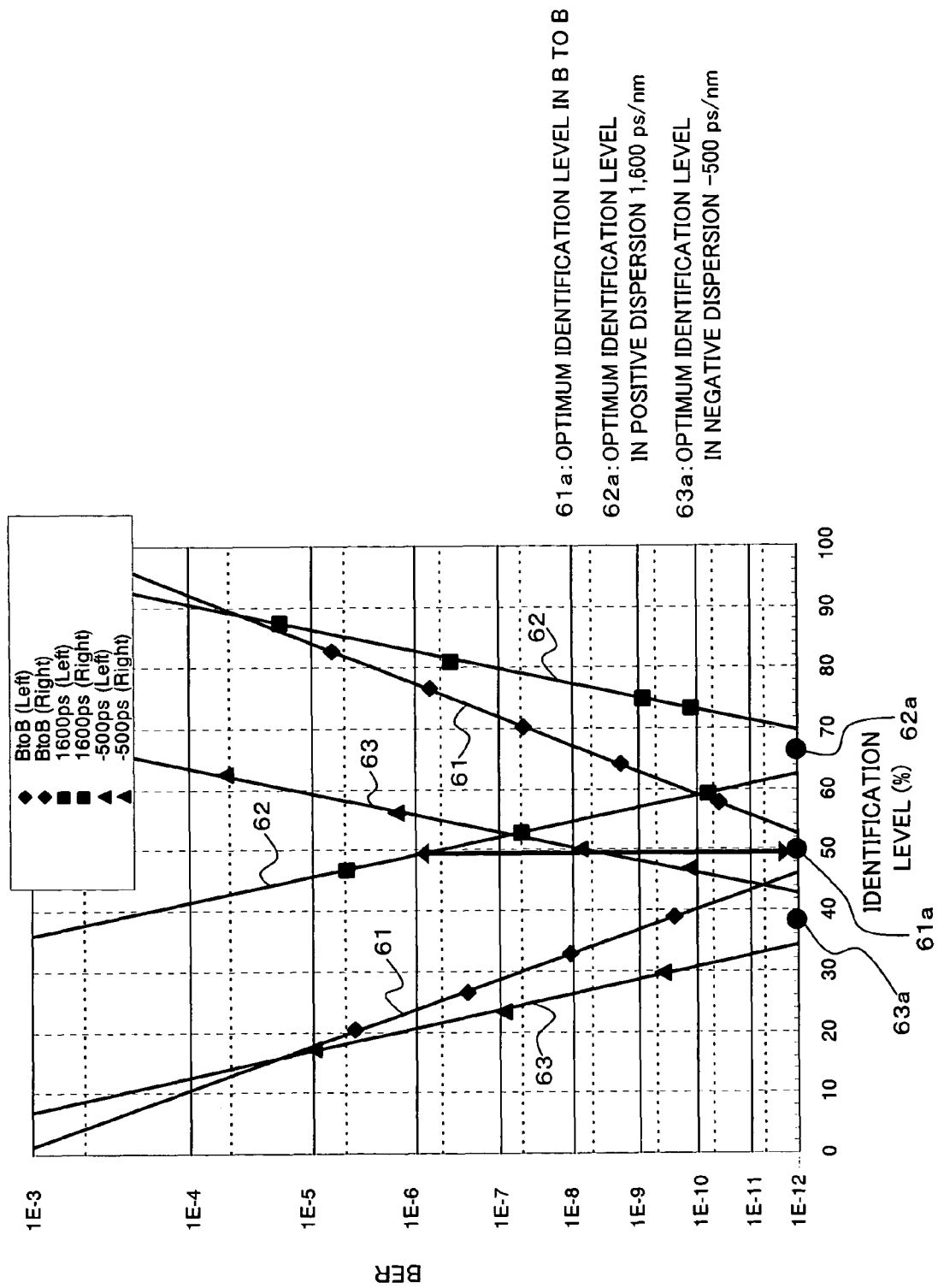
FIG. 5 is a view illustrating an example of an identification level to bit error (BER) characteristic.
Figure 6:
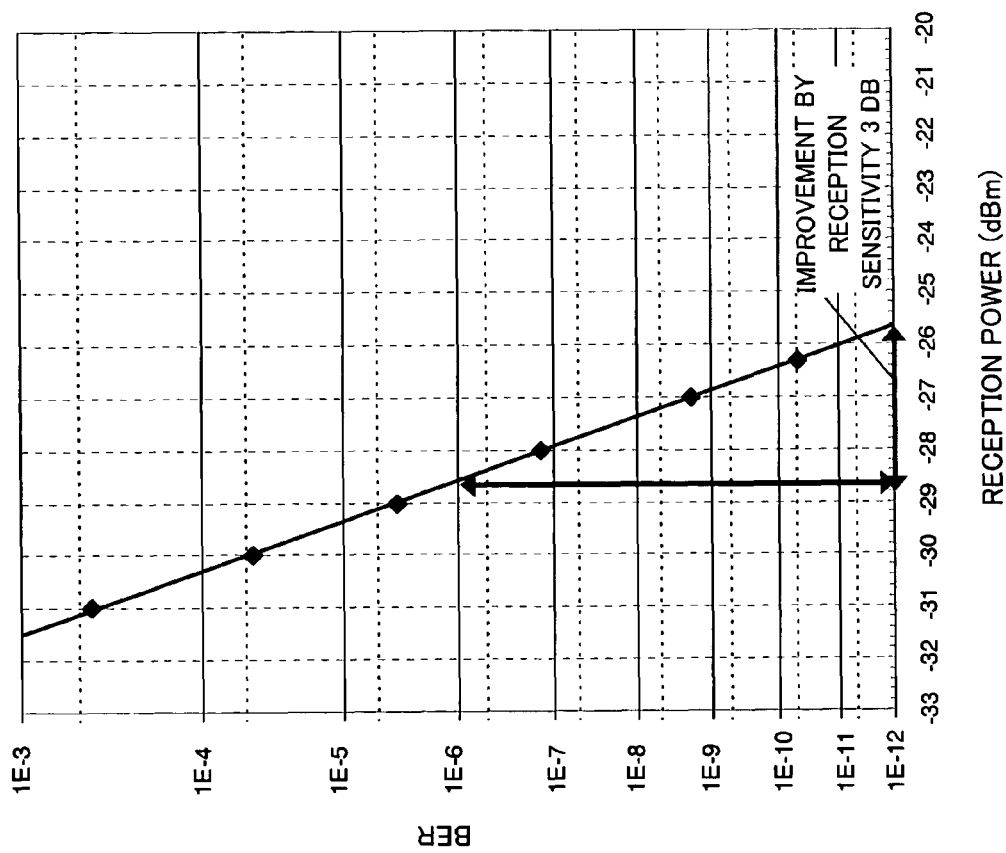
FIG. 6 is a view illustrating an example of reception power to BER characteristic.

For example, an identification level to bit error (BER) characteristic and a reception power to BER characteristic are illustrated in FIGS. 5 and 6, respectively.

In FIG. 5, the BER when the identification level is varied is plotted and an opening of an eye (EYE) is shown. Three plotting patterns in the cases of the B to B (refer to reference numeral 61), a positive dispersion of 1,600 ps/nm (refer to reference numeral 62) and a negative dispersion of −500 ps/nm (refer to reference numeral 63) are shown in FIG. 5, and it is indicated that the identification levels of 50% (refer to reference character 61$a$), 65% (refer to reference character 62$a$) and 40% (refer to reference character 63$a$) are optimum for them, respectively, by which an error-free state is implemented.

In the present embodiment, since the identification level is variably controlled in response to the chromatic dispersion amount, the reception sensitivity does not degrade. However, where the identification level is fixed to 50% as in the conventional technique, the BER significantly degrades from 1E-12 to 1E-6, for example, at the positive dispersion of 1,600 ps/nm as shown in FIG. 5. If this is converted into the reception sensitivity characteristic illustrated in FIG. 6, then the degradation amount of the BER is approximately 3 dB. Accordingly, with the optical reception circuit in the present embodiment, an effect of the improvement in the reception sensitivity characteristic by approximately 3 dB can be anticipated.

[B] Description of Modifications

Figure 7:
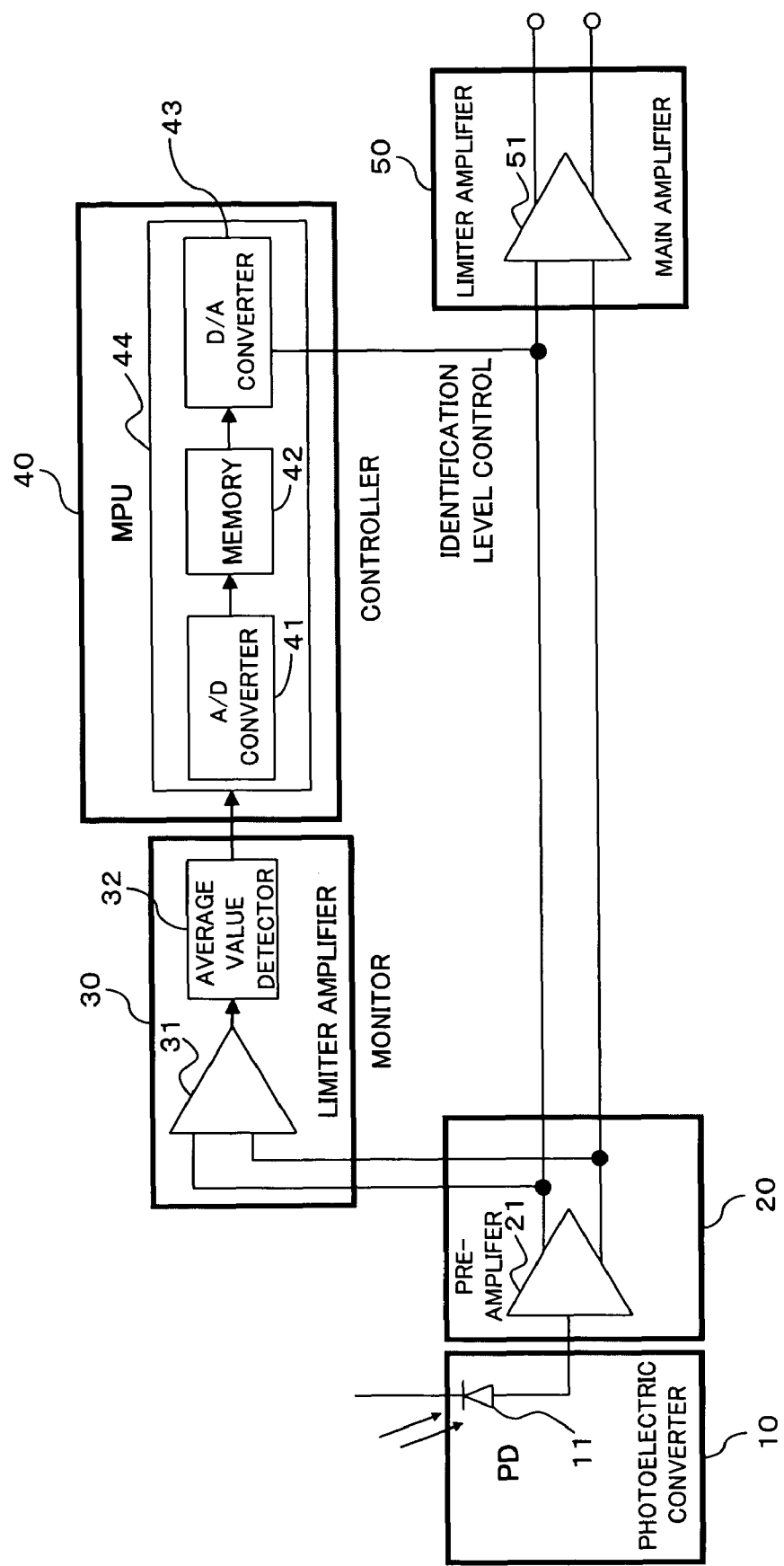
FIG. 7 is a block diagram showing a modification to the optical reception circuit shown in FIG. 1.

The functions of the A/D converter 41, memory 42 and D/A converter 43 of the controller 40 described above can be implemented, for example, also by an MPU (Micro Processing Unit) 44 as shown in FIG. 7. In this instance, miniaturization of the optical reception circuit can be implemented.

Figure 8:
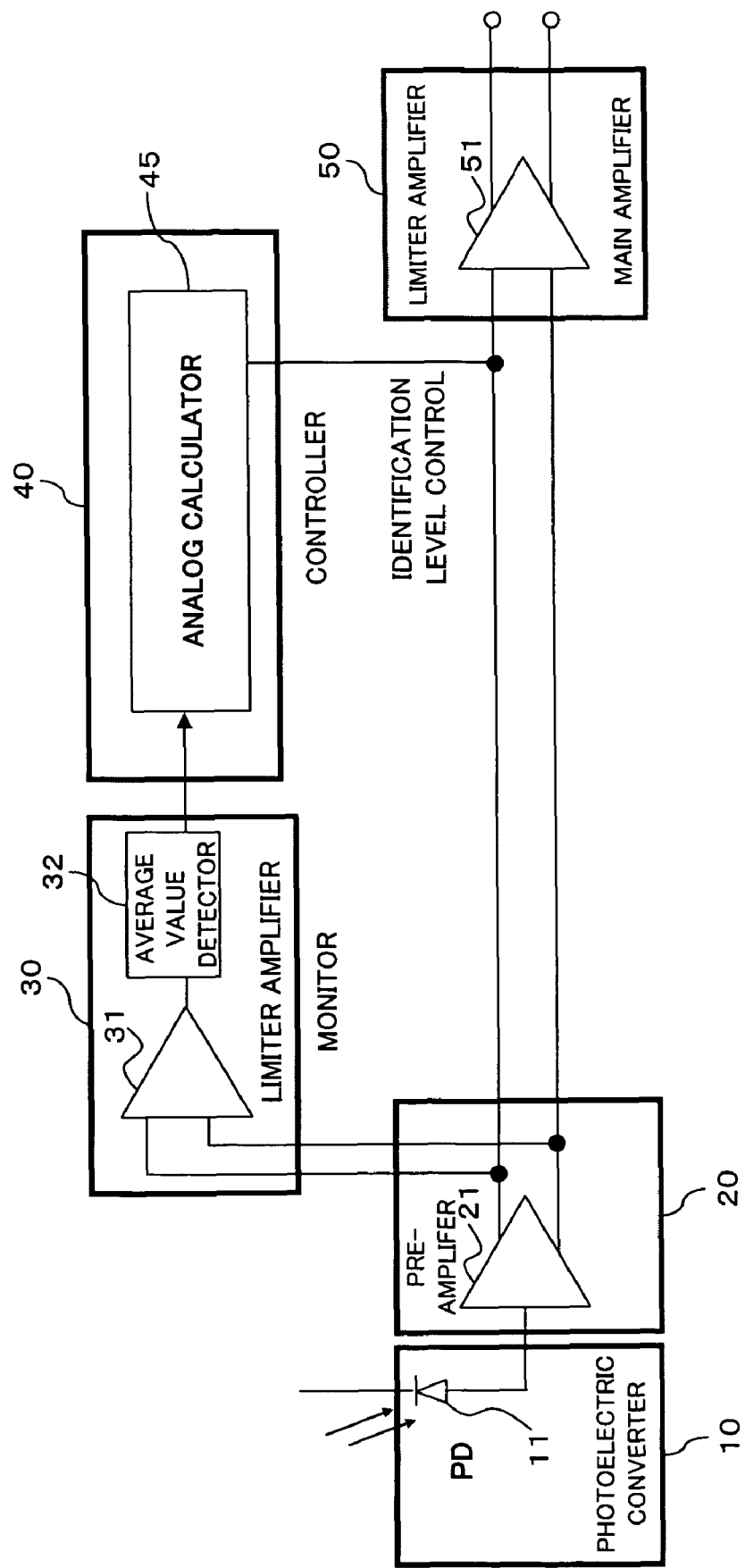
FIG. 8 is a block diagram showing another modification to the optical reception circuit shown in FIG. 1.

Also it is possible to use, for example, as shown in FIG. 8, an analog calculator 45 for performing, in order to determine a controlling signal for the identification level from the average value detected by the average value detector 32, analog calculation based on the relational expression illustrated in FIG. 3, that is, calculation according to an analog calculation expression which indicates a relationship of the identification level to the time average value of the output amplitude of the limiter amplifier 31, can be used. In this instance, increase in speed of the controlling process for the identification level can be implemented.

Figure 9:
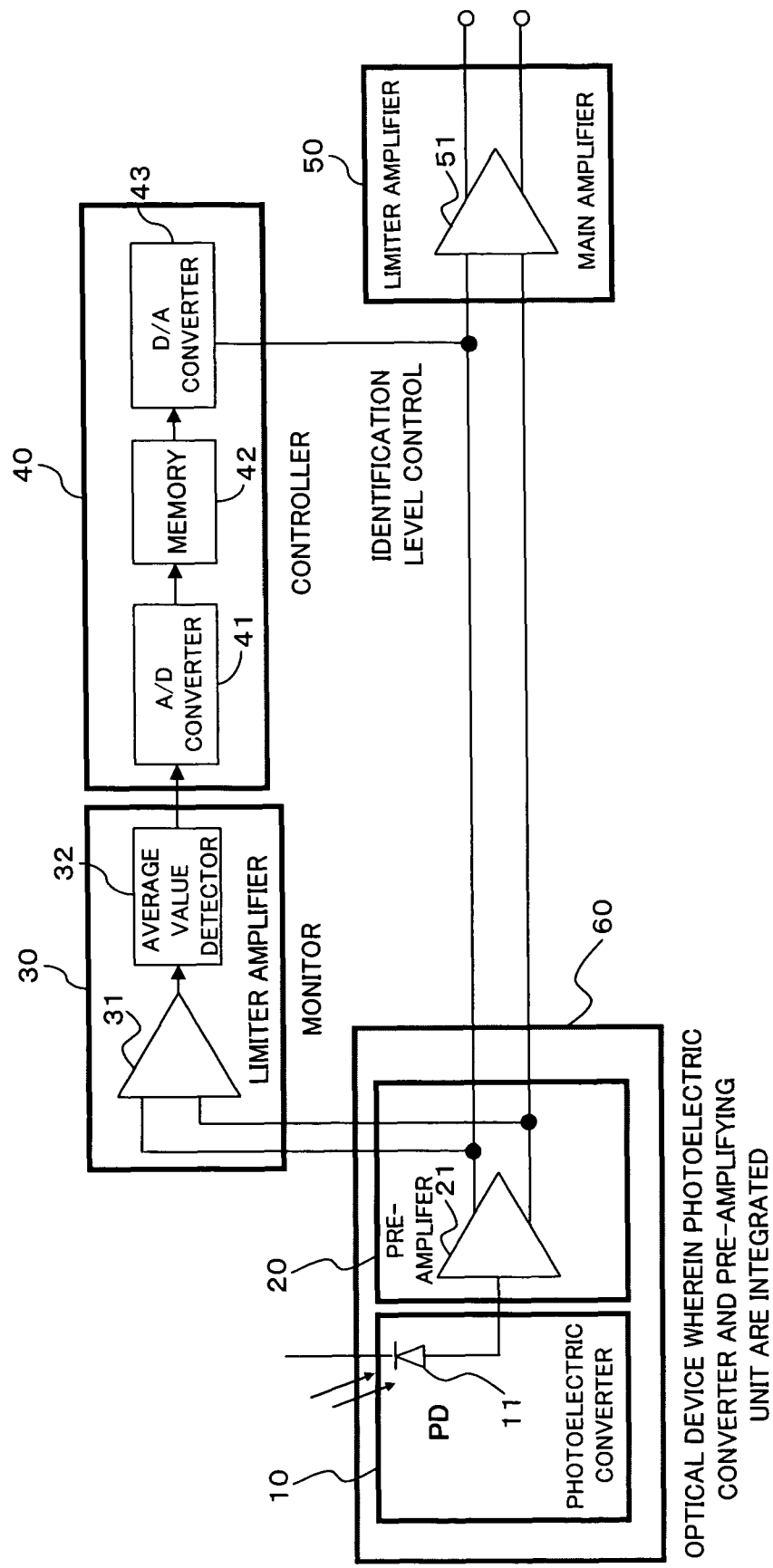
FIG. 9 is a block diagram showing a further modification to the optical reception circuit shown in FIG. 1.

Also it is possible to form, for example, as shown in FIG. 9, the photoelectric converter 10 and pre-amplifying unit 20 as an integrated optical device 60. In particular, the photoelectric converter 10 and the pre-amplifying unit 20 can be formed from preamplifier built-in type PIN-PDs, preamplifier built-in type APDs or the like, and by this, miniaturization of the optical reception circuit can be implemented.

Figure 10:
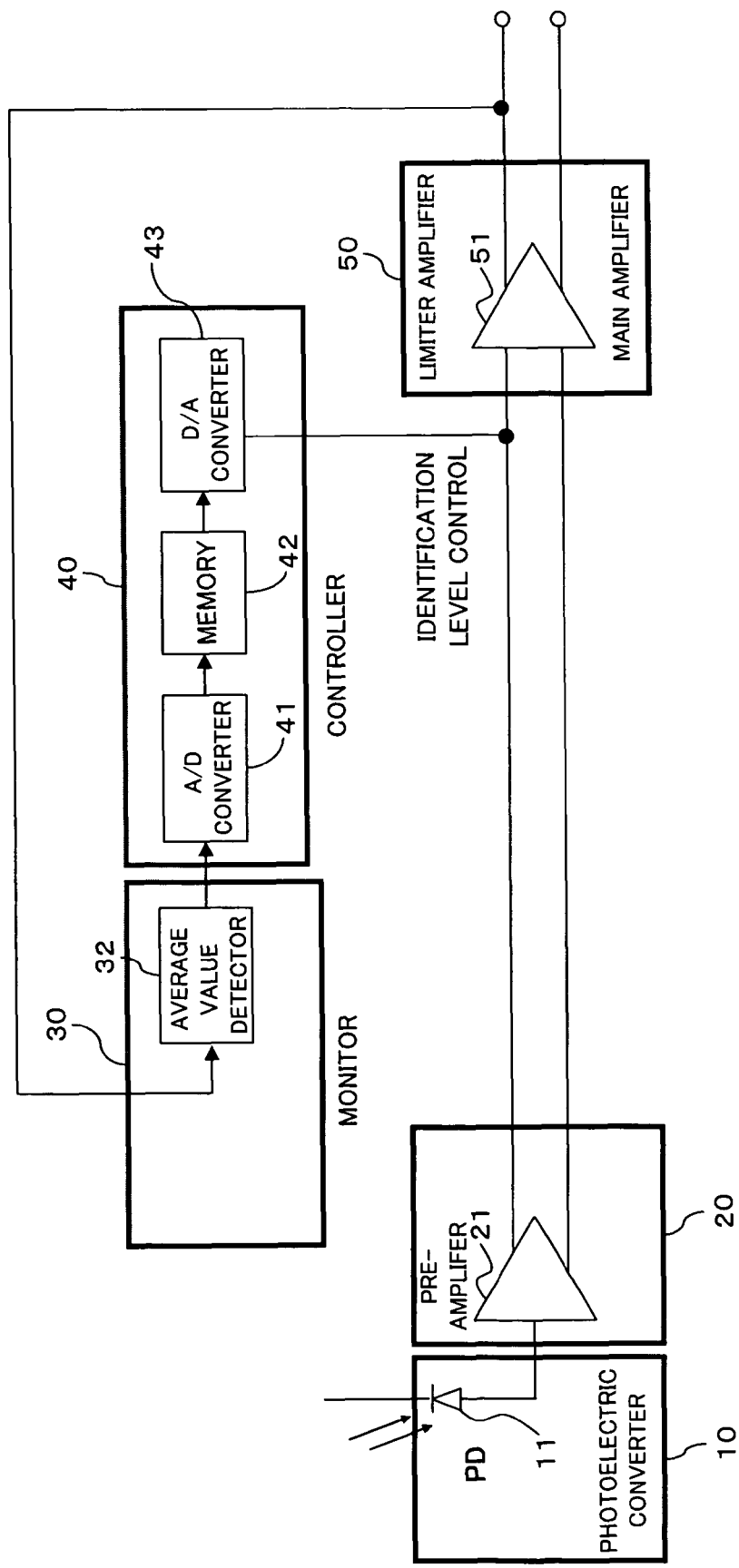
FIG. 10 is a block diagram showing a still further modification to the optical reception circuit shown in FIG. 1.
Figure 11:
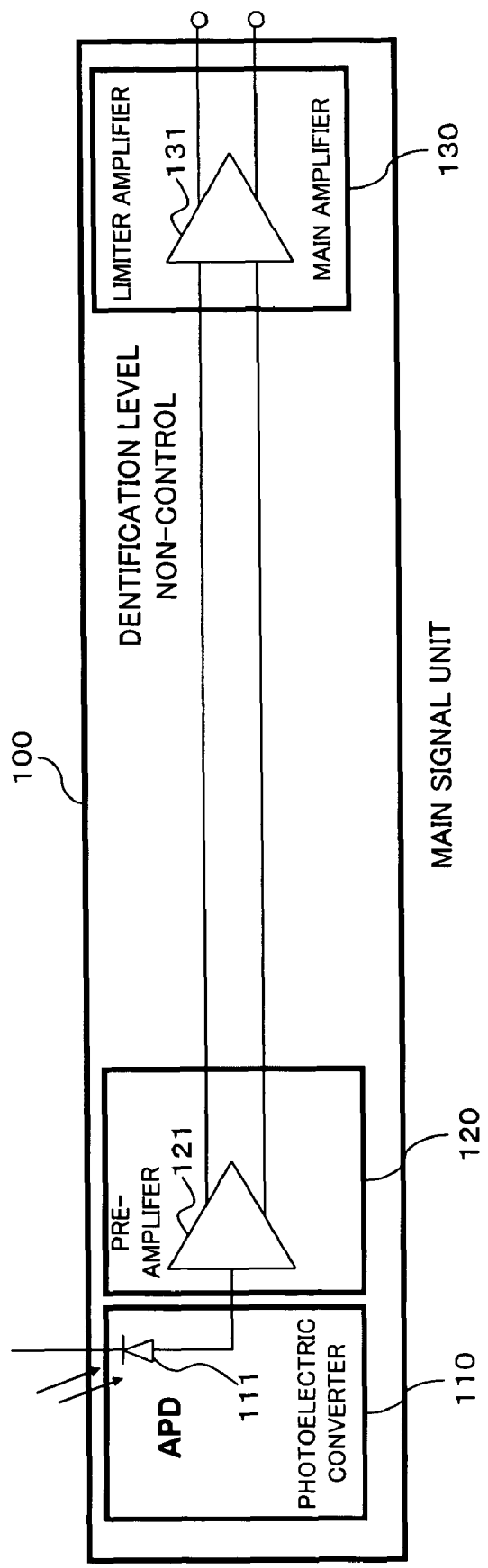
FIG. 11 is a block diagram showing a configuration of essential part of a conventional optical reception circuit.
Figure 12:
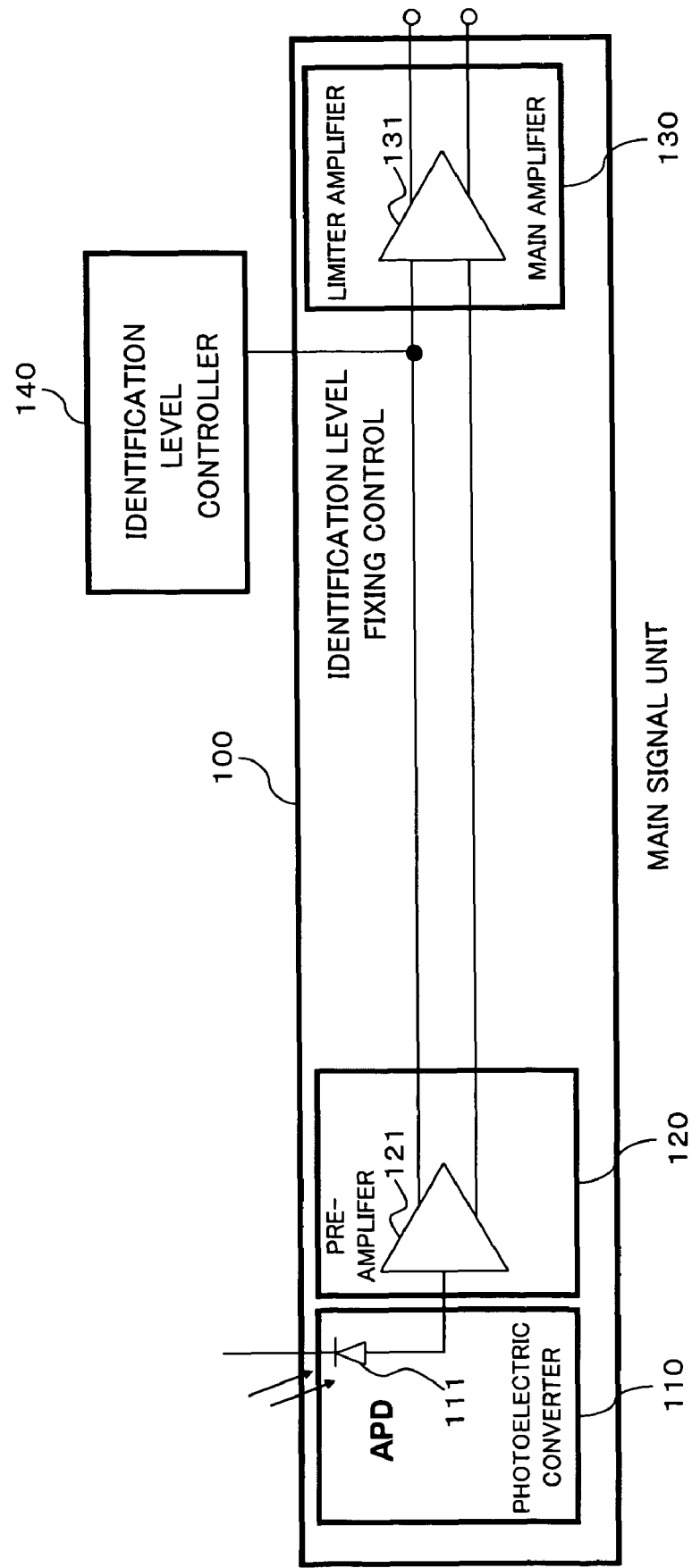
FIG. 12 is a block diagram showing a configuration of essential part of a different conventional optical reception circuit.

Further, while the limiter amplifier 31 in the embodiment described above is provided separately from the limiter amplifier 51 in the monitor 30 such that the average value of the output of the limiter amplifier 31 is detected by the average value detector 32, even if a feedback configuration wherein the average value of the output of the limiter amplifier 51 is detected by the average value detector 32 is applied, for example, as shown in FIG. 10, identification level control equivalent to that of the embodiment described above can be implemented.

In this instance, since the limiter amplifier 31 of the monitor 30 can be eliminated, still more reduction in size of the optical reception circuit can be implemented. It is to be noted that, also in FIG. 10, the controller 40 (A/D converter 41, memory 42, and D/A converter 43) may be formed from an MPU similarly to that shown in FIG. 7 or from an analog calculator similarly to that shown in FIG. 8. Further, the photoelectric converter 10 and the pre-amplifying unit 20 may be integrated similarly to those shown in FIG. 9.

As described in detail above, with the present invention, the output of the pre-amplifying unit or the main amplifier in the optical reception circuit is monitored and the time average value of the amplitude is detected, and the identification level in the main amplifier is dynamically controlled in response to the result of the detection. Consequently, reception sensitivity degradation by the chromatic dispersion in the optical reception circuit can be suppressed, and an effect of significant improvement in the reception sensitivity characteristic can be expected. Accordingly, the present invention is very useful to the technical field of the optical communication.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An optical reception circuit, comprising:
   a photoelectric converter converting reception light into an electric signal;
   a pre-amplifier for amplifying the electric signal;
   a main amplifier amplifying an output of said pre-amplifier;
   a monitor monitoring the output of said pre-amplifier; and a controller controlling an identification level in said main amplifier based on an output of said monitor;

said monitor including:

a limiter amplifier amplifying the output of said pre-amplifier; and an average value detector detecting a time average value of an output amplitude of said limiter amplifier, wherein said controller calculates a relationship of the identification level to the time average value of the output amplitude of said limiter amplifier, based on a relationship of a duty of an output waveform of said pre-amplifier to the time average value of the output amplitude of said limiter amplifier and a relationship of a chromatic dispersion amount of the reception light to the duty and a relationship of the identification level to the chromatic dispersion amount, and controls the identification level in said main amplifier based on the result of the calculation.

2. The optical reception circuit according to claim 1, wherein said photoelectric converter and said pre-amplifier are formed from an integrated optical device.

3. The optical reception circuit according to claim 1, wherein said controller includes a memory storing at least the relationship of the identification level to the time average value of the output amplitude of said limiter amplifier in advance.

4. The optical reception circuit according to claim 1, wherein said controller is formed from a micro processing unit.

5. The optical reception circuit according to claim 1, wherein said controller includes an analog arithmetic operator controlling the identification level based on an analog arithmetic operation expression which represents the relationship of the identification level to the time average value of the output amplitude of said limiter amplifier.

6. An identification level controlling method for an optical reception circuit which includes a photoelectric converter converting reception light into an electric signal, a pre-amplifier for amplifying the electric signal, a main amplifier amplifying an output of said pre-amplifier, and a controller controlling an identification level of said main amplifier, comprising the steps of:

(a) monitoring the output of said pre-amplifier; and (b) controlling the identification level in said main amplifier based on a time average value of the output amplitude detected at the monitoring step (a);

wherein the control step (b) includes a control signal production step of producing a control signal for the identification level, based on a relationship of a duty of an output waveform of said pre-amplifier to the time average value of the output amplitude of said limiter amplifier and a relationship of a chromatic dispersion amount of the reception light to the duty and a relationship of the identification level to the chromatic dispersion amount.

7. The identification level controlling method according to claim 6, wherein, at the monitoring step (a), the output of said pre-amplifier is amplified by a limiter amplifier, and a time average value of the output amplitude of said limiter amplifier is detected.

* * * * *